March 7, 1950 W. B. ELDER 2,499,473
VARISPEED WASHER TRANSMISSION
Filed Aug. 20, 1947 2 Sheets-Sheet 1

W. B. Elder
INVENTOR
BY C.A.Snow & Co.
ATTORNEYS.

March 7, 1950        W. B. ELDER        2,499,473
VARISPEED WASHER TRANSMISSION
Filed Aug. 20, 1947        2 Sheets-Sheet 2
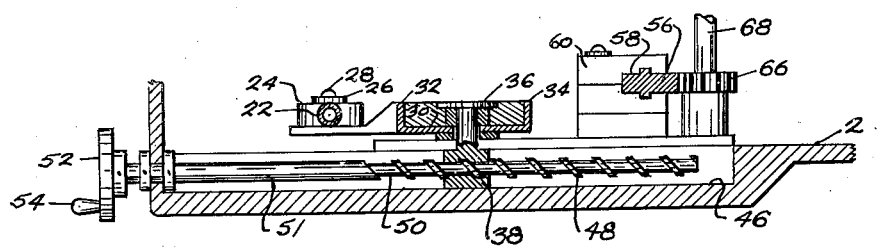
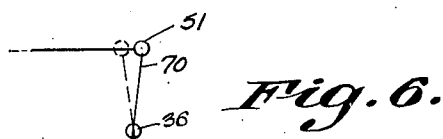
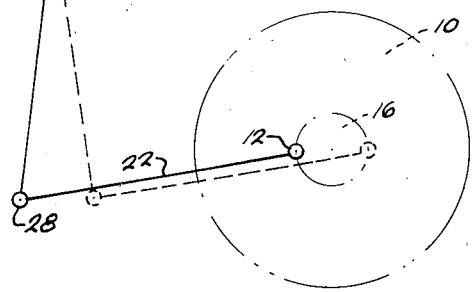
W. B. Elder
INVENTOR Patented Mar. 7, 1950

2,499,473

UNITED STATES PATENT OFFICE 2,499,473

VARISPEED WASHER TRANSMISSION

William B. Elder, Burnham, Pa.

Application August 20, 1947, Serial No. 769,578

1 Claim. (Cl. 74—76)

My present invention relates to an improved mechanical movement of the type converting rotary motion to reciprocating motion and including a fulcrumed lever actuated by the reciprocating motion, the fulcrum of which may be moved longitudinally of the lever to vary the reciprocation thereof.

The device is especially adapted for use in oscillating washing machines and by movement of the location of the lever fulcrum, the length of the arc of oscillation may be varied from maximum to zero without the use of gearing or clutch arrangements.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 4 is a sectional view at line 4—4 of Fig. 1.

Figs. 5 and 6 are schematic views of the movement in maximum and minimum positions respectively.

Figure 1:
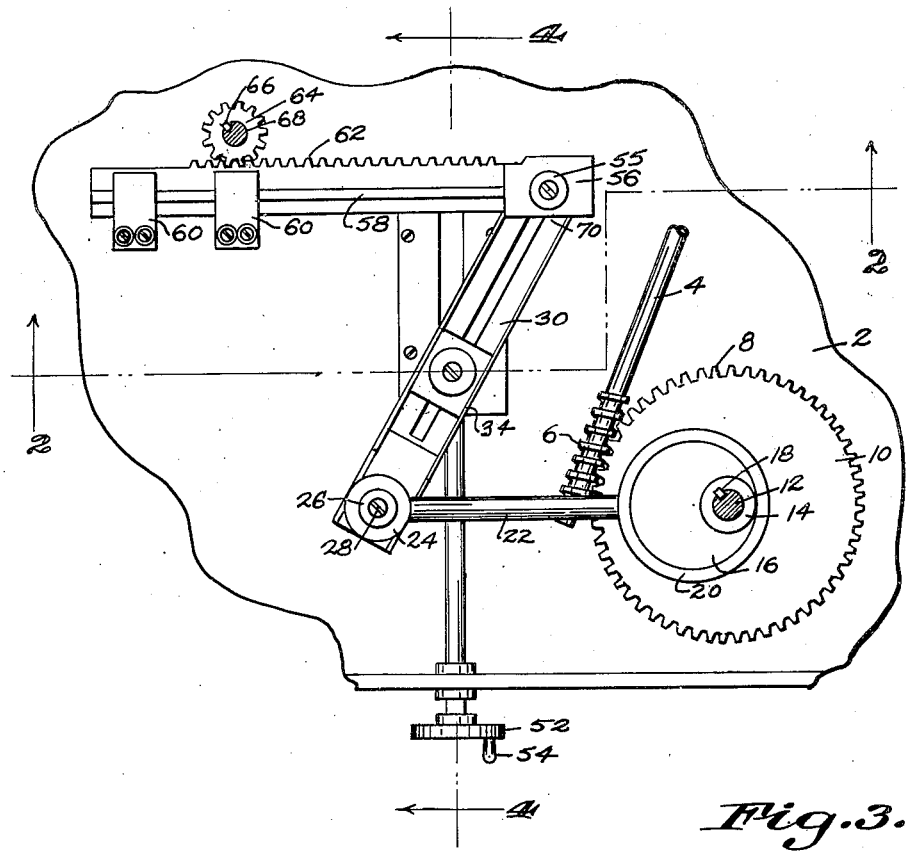
Fig. 1 is a top plan view of the movement of my invention.
Figures 2, 3:
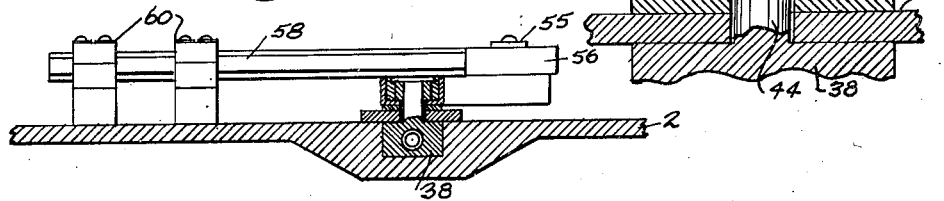
Fig. 2 is a sectional view at line 2—2 of Fig. 1.
Fig. 3 is an enlarged detail sectional view of the movable fulcrum mechanism.

Referring now to the drawings wherein I have illustrated the present preferred embodiment of my invention I employ with the base 2, a driven shaft 4 having worm gearing 6 engaging the teeth 8 of gear 10 on shaft 12 in driving relation therewith.

The collar 14 of cam disk 16 is secured by key 18 to the shaft 12 and rotates with the ring 20 of connecting rod 22. The small ring 24 of the rod 22 is secured to pin 26 by screw 28 on the end of lever 30 having side flanges 32 and 34.

The lever is pivotally mounted or fulcrumed on pin 36 of block 38 and secured by screw 40 and washer 42 and the pin is slidable in the longitudinal slot 44 of the lever. The block is located in the long recess 46 of the base 2 and has threaded thereon the worm gear 48 of shaft 50 rotated in sleeve 51 by crank wheel 52 and handle 54.

The other end of the lever is pivotally attached at 55 to the end of rack bar 56 having ribs 58 in guide blocks 60 and the teeth 62 of the rack bar engage the cog 64 keyed at 66 on shaft 68.

It will be seen that with the lever fulcrum located at a point away from the driven end 70 of the lever movement will be imparted thereto by the movement of the connecting rod. With the movement of the block however toward the longitudinal center of the lever, the end 70 will reciprocate and any length to the reciprocation will be imparted to the rack bar to oscillate the cog and its shaft. If the block is near the end 70 the oscillation arc will be short, and the nearer the block is moved to the center of the lever, the greater will be the arc of oscillation.

Obviously then by sole, simple use of the control crank wheel, the arc of oscillation may be varied from zero to maximum of approximately 180 degrees.

Having thus fully described my invention what I claim as new and desire to secure by Letters Patent is:

In a mechanical movement, a base having an elongated recess formed in the upper surface thereof, a driving means including a driving gear mounted on the base, a cam disc and ring operating thereon, a reciprocating connecting rod connected with said ring, a lever pivotally connected at one of its ends to the connecting rod, a rack bar pivotally connected to the opposite end of the lever, said lever having an elongated slot formed longitudinally thereof, a block mounted within the recess of the base, a bearing pin rising from the block disposed in the elongated slot of the lever into which the pin extends providing a fulcrum for the lever, the fulcrum being movable longitudinally of the lever, said block having a threaded bore extending transversely therethrough, a sleeve disposed longitudinally of the recess of the base, a threaded shaft mounted within the sleeve operating through the block in engagement with the threads of the bore thereof, whereby rotation of the threaded shaft moves the block and bearing pin longitudinally of the elongated recess, adjusting the position of the block and bearing pin carried thereby along the lever, varying the stroke of said lever and rack bar.

WILLIAM B. ELDER.

REFERENCES CITED

The following references are of record in the file of this patent:

UNITED STATES PATENTS

| Number | Name | Date |
|---|---|---|
| 247,613 | Carson | Sept. 27, 1881 |
| 503,561 | Campbell | Aug. 15, 1893 |
| 678,172 | Drist | July 9, 1901 |
| 712,028 | Werner | Oct. 28, 1902 |
| 887,785 | Gauntt | May 19, 1908 |
| 950,317 | Doherty | Feb. 22, 1910 |
| 2,014,476 | Johnson | Sept. 17, 1935 |